United States Patent
Pearson

(10) Patent No.: US 7,742,589 B2
(45) Date of Patent: Jun. 22, 2010

(54) DISTINCTIVE CALL WAITING BASED ON A REDIRECTING NUMBER

(75) Inventor: Larry B. Pearson, San Antonio, TX (US)

(73) Assignee: AT&T Intellectual Property I, LP, Reno, NV (US)

( * ) Notice: Subject to any disclaimer, the term of this patent is extended or adjusted under 35 U.S.C. 154(b) by 1448 days.

(21) Appl. No.: 10/705,766

(22) Filed: Nov. 10, 2003

(65) Prior Publication Data

US 2005/0100152 A1    May 12, 2005

(51) Int. Cl.
*H04M 3/42* (2006.01)

(52) U.S. Cl. ............ 379/207.16; 379/211.02; 379/215.01

(58) Field of Classification Search ............ 379/211.02
See application file for complete search history.

(56) References Cited

U.S. PATENT DOCUMENTS

| | | | |
|---|---|---|---|
| 5,353,331 A | 10/1994 | Emery et al. | |
| 5,469,496 A | 11/1995 | Emery et al. | |
| 5,904,013 A | 5/1999 | Greenspan et al. | |
| 5,926,537 A | 7/1999 | Birze | |
| 5,995,839 A | 11/1999 | Coursey et al. | |
| 6,091,949 A | 7/2000 | Sanchez | |
| 6,130,938 A | 10/2000 | Erb | |
| 6,185,427 B1 | 2/2001 | Krasner et al. | |
| 6,188,888 B1 | 2/2001 | Bartle et al. | |
| 6,208,854 B1 | 3/2001 | Roberts et al. | |
| 6,301,350 B1 | 10/2001 | Henningson et al. | |
| 6,320,534 B1 | 11/2001 | Goss | |
| 6,332,021 B2 * | 12/2001 | Latter et al. ............ | 379/142.01 |
| 6,362,778 B2 | 3/2002 | Neher | |
| 6,373,817 B1 | 4/2002 | Kung et al. | |
| 6,404,858 B1 | 6/2002 | Farris et al. | |
| 6,411,704 B1 | 6/2002 | Pelletier et al. | |
| 6,411,802 B1 | 6/2002 | Cardina et al. | |
| 6,424,840 B1 | 7/2002 | Fitch et al. | |
| 6,480,593 B1 | 11/2002 | Munday et al. | |
| 6,516,060 B1 | 2/2003 | Foladare et al. | |
| 6,574,470 B1 | 6/2003 | Chow et al. | |
| 6,587,475 B1 | 7/2003 | Przygienda | |
| 6,738,466 B1 * | 5/2004 | LaPierre et al. ........ | 379/211.02 |
| 2002/0198007 A1 | 12/2002 | Zimmerman | |
| 2005/0047565 A1 * | 3/2005 | Nassimi ............... | 379/93.05 |
| 2006/0104434 A1 * | 5/2006 | Nguyen et al. ......... | 379/373.01 |

OTHER PUBLICATIONS

Verb Exchange Service—Tagline—One number gets me everywhere; www.verbx.com/srv/service_tagline.html; 1 page, Nov. 5, 2003.

(Continued)

*Primary Examiner*—Rasha S Al Aubaidi
(74) *Attorney, Agent, or Firm*—Toler Law Group

(57) ABSTRACT

The disclosure is directed to a method of providing a distinctive call waiting tone based on a redirecting number. The method includes receiving a call from an originating device at a redirecting device; forwarding the call from the redirecting device to a destination device; and applying a distinctive type of call waiting tone to the destination device based upon determining that a data message includes a redirecting number. The forwarded call has an associated data message that includes a calling number of the origination device, a called number of the destination device, and a redirecting number of the redirecting device.

23 Claims, 5 Drawing Sheets

OTHER PUBLICATIONS

Zbar, Jeff "Follow-me phone service keeps remote worker tethered to clients, co-workers"; NetworkWorldFusion; www.nwfusion.com/net.worker/columnists/2002/0826zbar.html; 3 pages, Aug. 26, 2002.
www.officescape.com/services.asp; Follow-me phone; 1 page, Nov. 5, 2003.
Callagenix "call diversion service"; www.callagenix.com/services/diversion.html; 3 pages, Mar. 2003.
Gupta, Puneet, "Short Message Service: What, How and Where?"; Wireless Developer Network; www.wirelessdevnet.com/channels/sms/features/sms.html; 7 pages.
Webopedia; "Short Message Service"; www.webopedia.com/TERM/S/Short_Message_Service.html; 3 pages, Jul. 8, 2003.
"Cellular Phone and Roaming Service"; www.members.tripod.com/peacecraft/infomining/cellphon.htm; 19 pages, Jul. 8, 2003.

* cited by examiner

DISTINCTIVE CALL WAITING BASED ON A REDIRECTING NUMBER

FIELD OF THE DISCLOSURE

The present disclosure relates generally to a system and method of applying a distinctive type of call waiting tone based on a redirecting number.

BACKGROUND

Distinctive ringing on telephones has been used to alert called parties of a particular type of call, such as when callers dial different telephone numbers than a main number. Distinctive call waiting uses a called number to determine a particular ring tone to use. An example of distinctive call waiting is in a household setting where each household member is assigned one of a set of numbers. When calls come into the main number, an inbound call is signaled by a normal ring tone or by a normal call waiting tone if the line is in use. If a call comes to one of the additional telephone numbers, the ring or call waiting tone is different than the normal ring or call waiting tone to identify that the call is for one of the children, instead of the parents. Based on the particular ring or call waiting tone, one of the children would answer the phone.

A person may forward their work phone number and/or their mobile phone to distinct numbers, such as a second or third phone number subscribed to at their residence. In this scenario, the mobile phone and the work phone could have different distinctive ring or call waiting tones assigned to such incoming call forwarded calls, given that they are forwarded to distinct numbers, such as a second or third subscriber phone numbers. A problem with this approach is misdialed and telemarketing calls. A called party may answer the call thinking it is a call from work and instead receive a telemarketing call. Customers find this problem irritating and confusing. Also, the personalized ring feature uses added phone numbers and leads to a scarcity of available phone numbers for a particular region. Severe phone number shortages could occur in certain market areas, resulting in undesirable area code splits or overlays.

Accordingly, there is a need for an improved system and method relating to distinctive ring and call waiting tones to identify different types of calls.

DETAILED DESCRIPTION OF THE DRAWINGS

Figure 1:
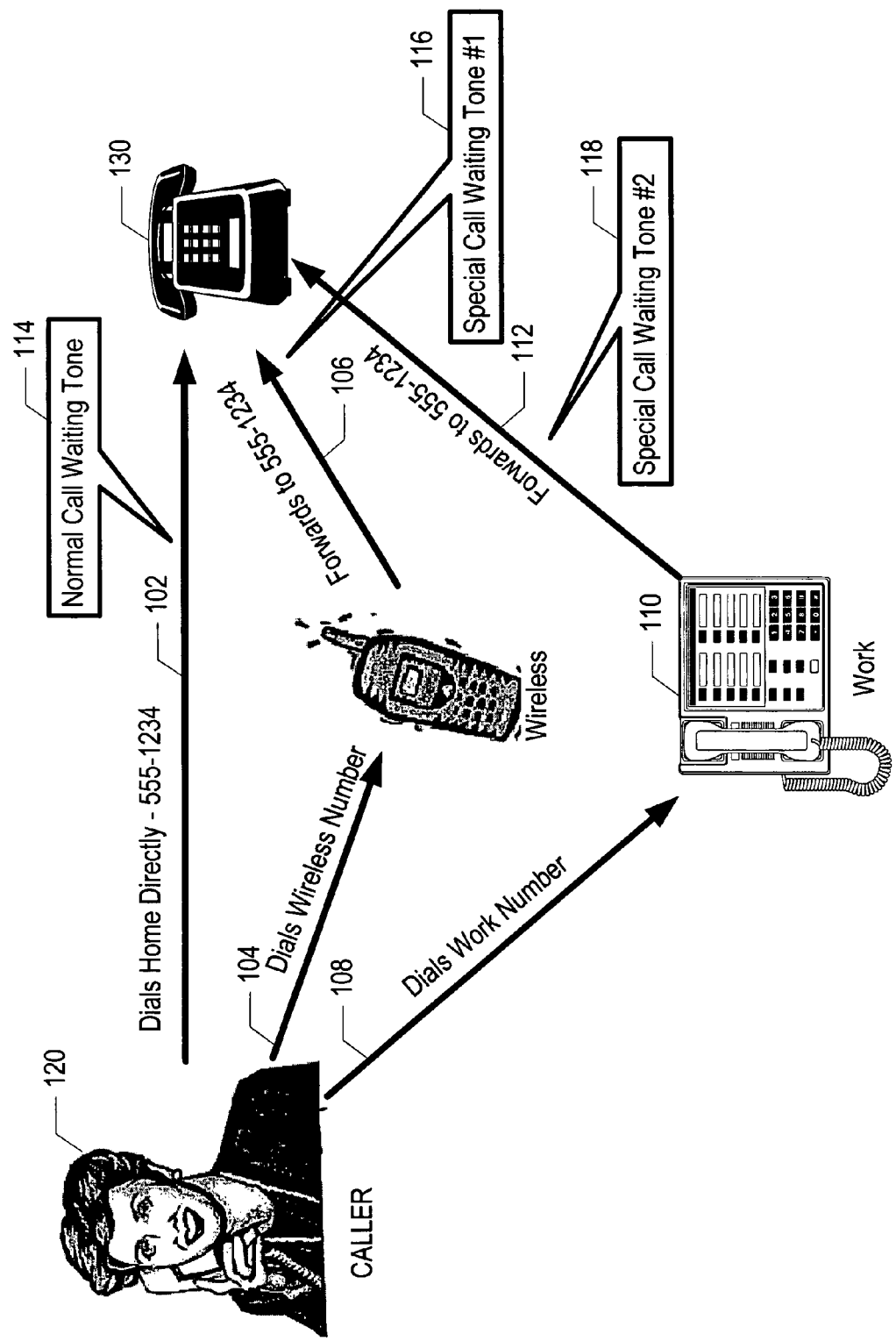
FIG. 1 is a general diagram that illustrates call forwarding and distinctive call waiting tones.

Referring to FIG. 1, an illustration of call paths from a caller 120 to a destination phone 130 is shown. A first call path 102 is from the caller 120 to the called party 130. A second call path 104 is from the caller 120, through a wireless phone and then forwarded over a redirected call path 106 to the destination phone 130. A third call path 108 is from the caller 120, through a work phone, and then forwarded over a redirected call path 112 to the destination 130. A first special call waiting tone 116 is applied upon receipt of a call at the destination 130 when the call is from the second call path 104. Similarly, a second special call waiting tone 118 is applied to the phone 130 upon receipt of a forwarded call via the third call path 108. The first special tone 116 and the second special tone 118 allows a called party at the destination 130 to determine whether a redirecting device is, for example, the subscriber's work phone or mobile phone.

Figure 2:
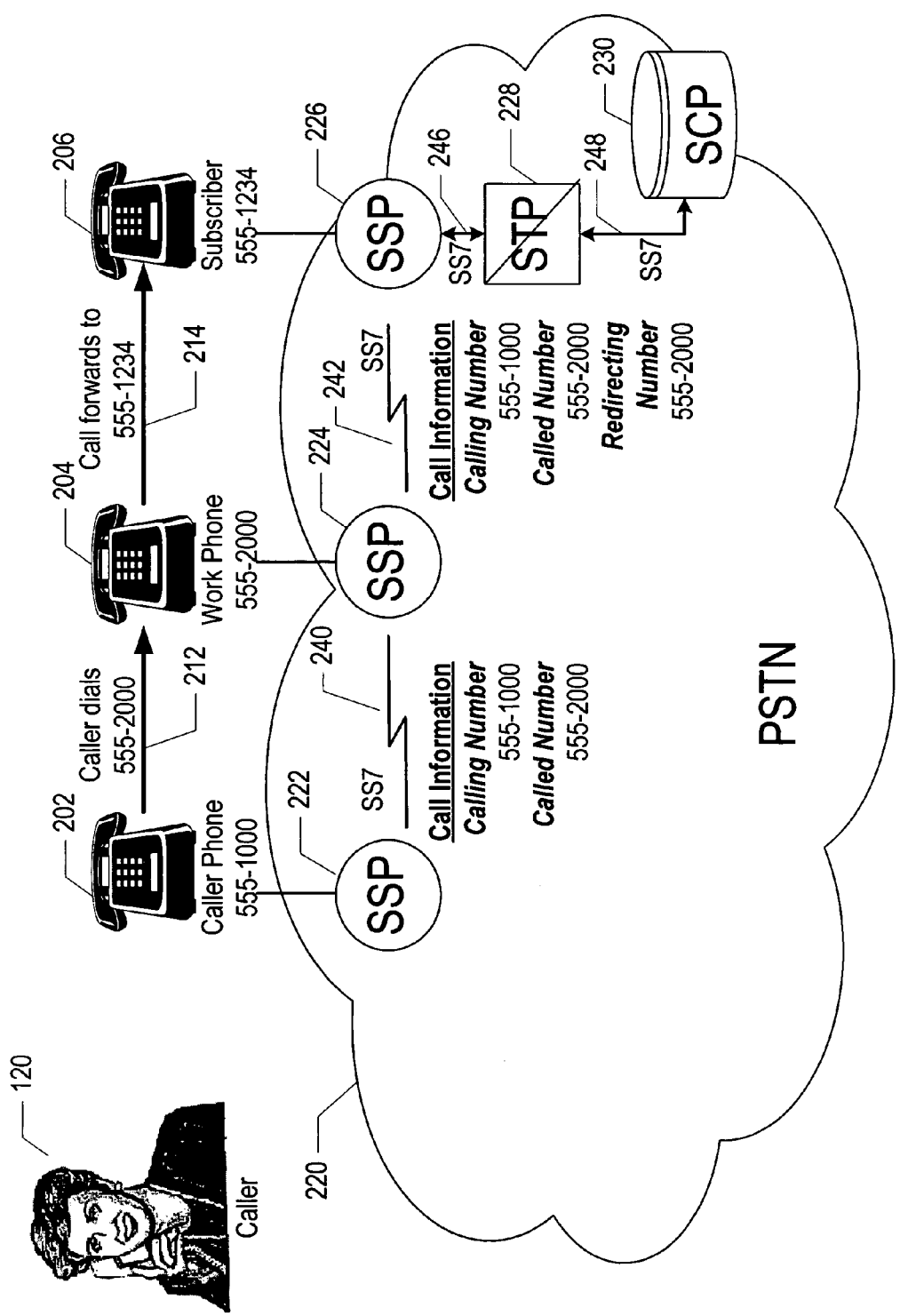
FIG. 2 is a general diagram that illustrates a system for handling call forwarding using a redirecting number.

Referring to FIG. 2, a system 220 for handling forwarded calls is shown. The system 220 includes a first service switching point (SSP) 222, a second SSP 224, and a third SSP 226. The system also includes a switching control point (SCP) 230 and a switch transfer point 228. The third SSP 226 is coupled to the SCP 230 via the STP 238 and via signaling system 7 (SS7) communications links 246 and 248. The second SSP 224 is coupled to the first SSP via SS7 link 240. The third SSP 226 is coupled to the second SSP 224 via SS7 link 242. The first SSP 222 corresponds to a caller phone 202 that is responsive to the caller 120. The second SSP 224 corresponds to an intermediate phone, such as work phone 204 having illustrative phone number "555-2000". The third SSP 226 corresponds to a destination subscriber device 206, such as a home telephone at a sample residential phone number "555-1234". The SSP may be implemented as a central office switch, such as class 5 switch and the subscriber's switch would typically support AIN version 0.1 or higher. The STP is used to route messages between SSPs, SCPs and IPs using the SS7 signaling protocol. The advanced intelligent network (AIN) service control point (SCP) provides programming logic to direct call control.

During operation, a caller 120 dials the work phone number "555-2000", at call path 212. This call is then forwarded by placing a second call along path 214 at number "555-1234" to reach the end subscriber device 206. Associated with the first call leg 212, the first SSP 222 sends data including the calling number and the called number over the SS7 link 240 to the second SSP 224. For the second call path 214, the second SSP 224 sends added information to the third SSP 226 via the SS7 link 242. For example, the SSP 224 sends calling number, the called number, and a redirecting number. In this case, the redirecting number is "555-2000" since this number is associated with the forwarding work phone 204. The third SSP 226 receives the data from the second SSP 224 including receiving the redirecting number. The data redirecting number and other call information is then passed to the SCP 230 via the STP 238. The SCP 230 includes logic that determines the particular distinctive ringing or call waiting tone to be applied to the subscriber device 206 based upon the redirecting number. The SCP 230 returns an instruction to the third SSP 226 directing the SSP 226 to apply the particular distinctive ring or call waiting tone associated with the redirecting number to the end subscriber device 206. Thus the subscriber will hear a different ringing or call waiting tone based on the intermediate forwarding telephone (e.g. cell phone or work phone). In addition, the illustrated method avoids the issue of assigning a different telephone number such as for the conventional personalized ringing feature where multiple phone numbers are typically required.

Figure 3:
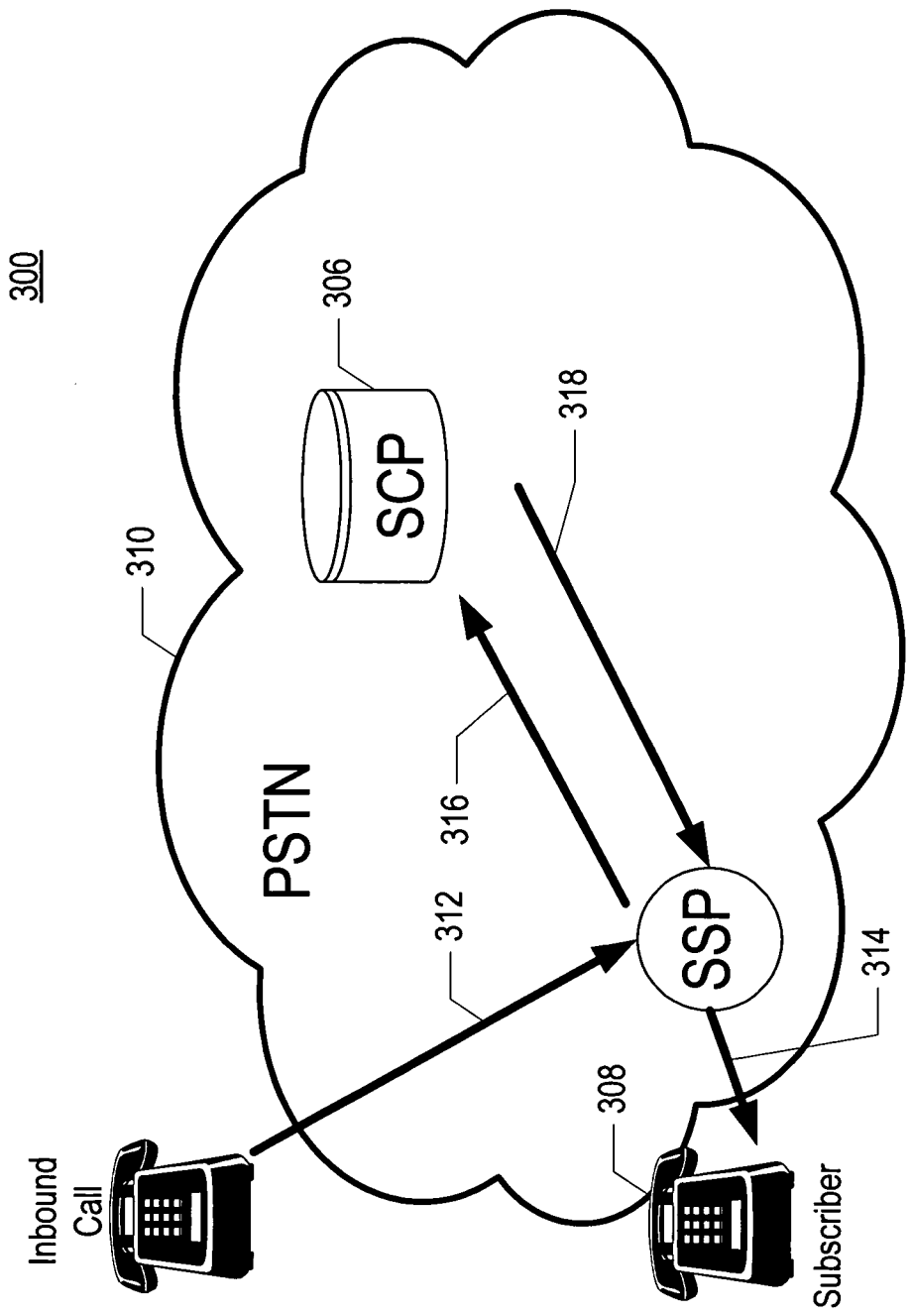
FIG. 3 is a general diagram that illustrates an advanced intelligent network system handling call forwarding using a redirecting number.

Referring to FIG. 3, an illustrative system is shown. The system includes the public switched phone network 310 and intelligent network elements, such as the SSP 304 and the SCP 306. The SSP 304 sends a request message 316 to the SCP 306 and receives an instruction message 318. The request message includes the redirecting number and the instruction message includes a distinctive ring or call waiting tone to be applied to a forwarded call from an inbound caller 302 to a destination 308.

During operation, a caller dials the subscriber phone number to place a call 312. The SSP 304 initiates a termination attempt trigger and sends a termination attempt query 316 to the SCP 306. The query includes the subscriber's telephone number, the caller's number (if available), and the redirecting number (RDN). The SCP 306 receives the query message and formulates a response message. The response message is formulated based on the following criteria:

For the user interface case where any forwarded call activates the distinctive ring tone, the SCP looks at the inbound call information. If it contains a redirecting number (RDN), the distinctive call waiting tone should be applied to the call. Otherwise, a normal call waiting tone will be applied to the call.

For the user interface case where only specific forwarded numbers activate the distinctive call waiting tone, the SCP looks at the inbound call information. If the inbound call contains a redirecting number (RDN) that matches a number in the distinctive ring/call waiting tone activation number list, the distinctive call waiting tone should be applied to the call. Otherwise, a normal call waiting tone will be applied to the call.

Based on the evaluation of the RDN, the SCP 306 sends the response message 318 (such as an authorize termination response message) back to the SSP 304. The response instructs the SSP to set the distinctive ring/call waiting tone on the subscriber line and to continue with the call. Where there is no RDN or if the distinctive ring/call waiting tone feature is not applicable, the SCP 306 sends a response message to continue with the call. The call 314 is routed to the subscriber 308, and the SSP 304 applies a distinctive ring/call waiting tone on the subscriber line if instructed to do so by the SCP 306. Otherwise, a normal ring tone is applied to the line.

Figure 4:
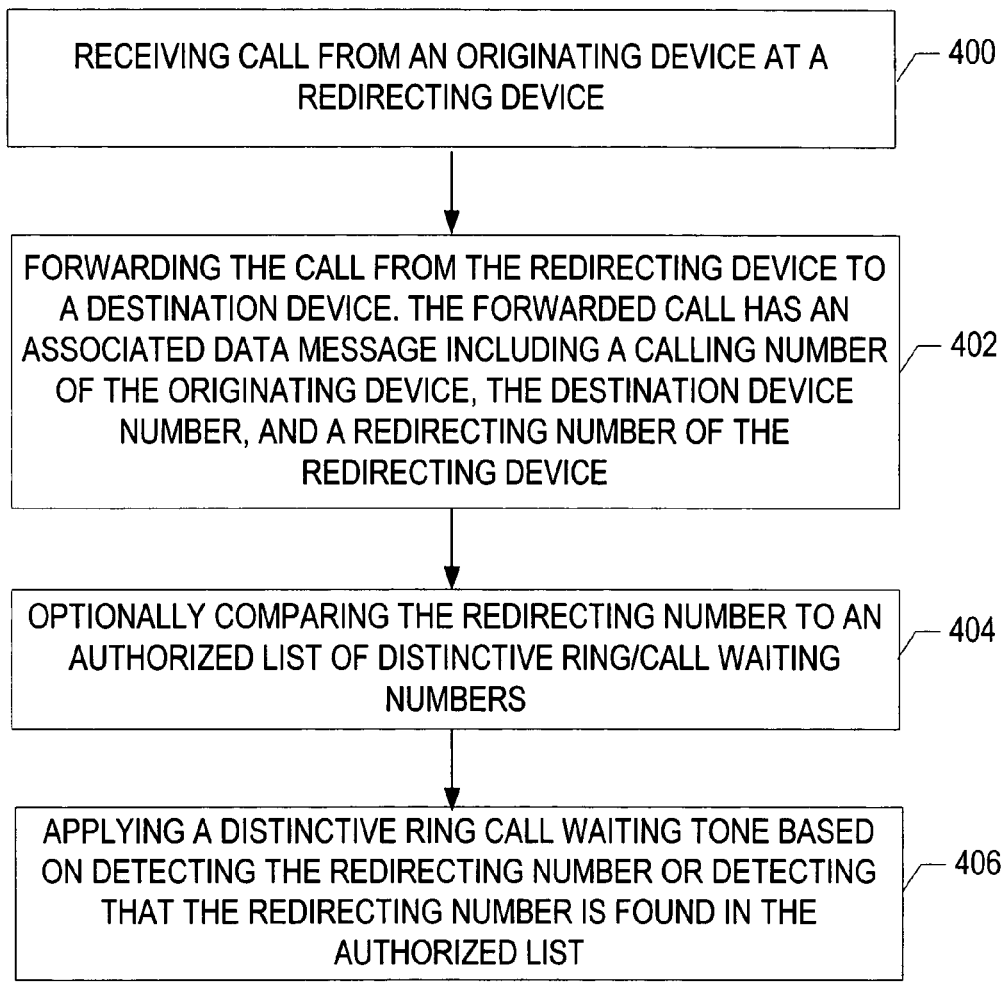
FIGS. 4 and 5 are flow charts that illustrate methods of forwarding calls using a redirecting number and distinctive call waiting tones.

Referring to FIG. 4, a method of handling a forwarded call and applying distinctive ring tones is shown. A call is received at a redirecting device from an origination device, at 400. For example, this step occurs when a caller dials the subscriber's number. The call is forwarded from the redirecting device to a destination device. The forwarded call has an associated data message that includes the calling number, the destination device number, and a redirecting number of the redirecting device, at 402. The redirecting number may optionally be compared to an authorized list of numbers having the distinctive ring/call waiting tone capability, at 404. If the redirecting number is within the authorized list of numbers, or if the comparison of step 404 is not made, then processing continues to step 406. At step 406, a distinctive ring or call waiting tone is applied to the destination device based on detecting the redirecting number or detecting that the redirecting number is found in the authorized list. In addition, where more than one type of distinctive ring tone is available, the particular distinctive ring tone is determined based on the particular redirecting number and the selected distinctive ring tone is applied. For example, a first distinctive ring tone may be associated with a first subscriber phone, such as cellular phone, and a second distinctive ring tone may be associated with a subscriber's work phone number.

Figure 5:
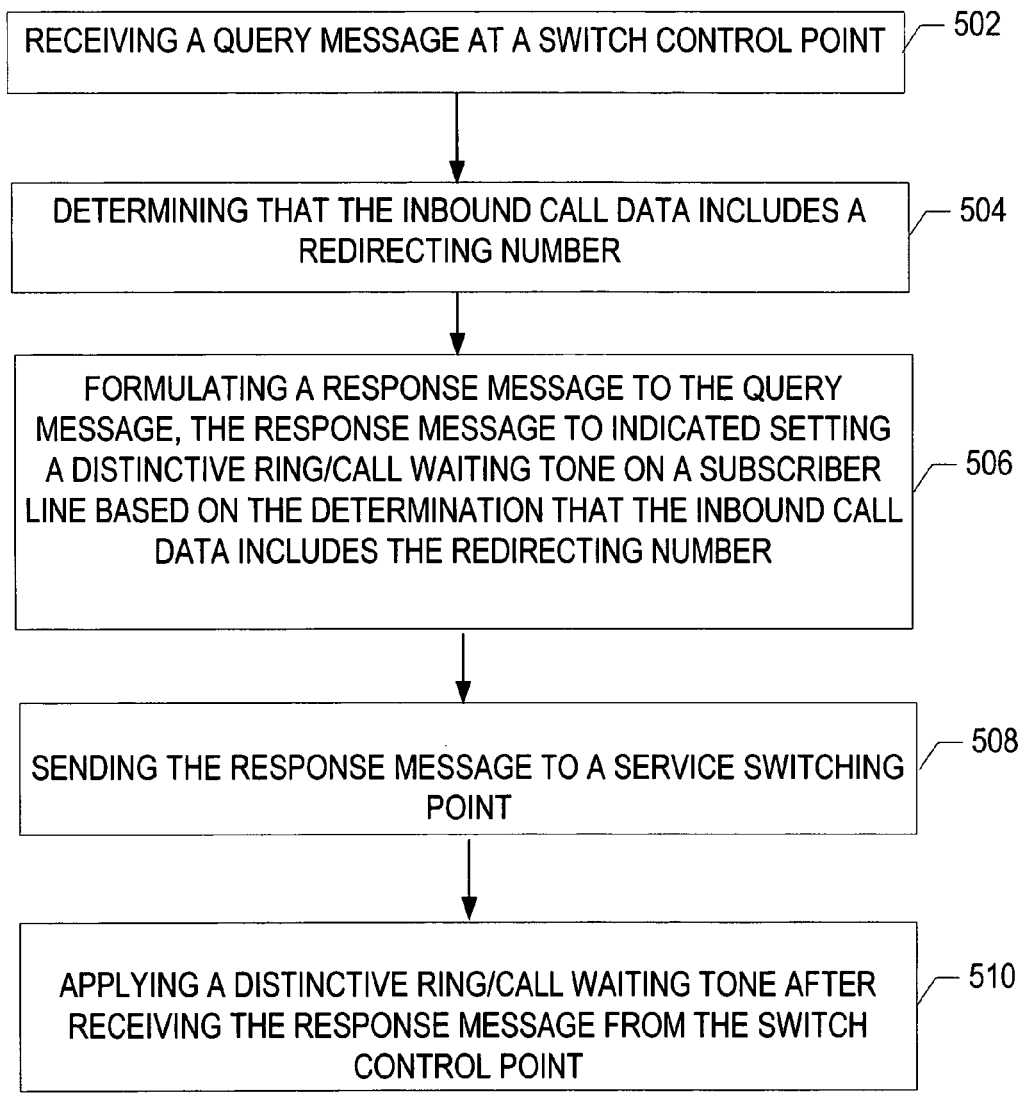

Referring to FIG. 5, a method of processing an intelligent network communication is disclosed. A query message is received at a switch control point, as shown at 502. The inbound call is evaluated to determine whether the call has a redirecting number, at 504. A response message is formulated to the query message. The response message is set to indicate a setting for a distinctive ring/call waiting tone for a particular subscriber destination line. The particular type of ring/tone is based on the redirecting number, as shown at 506. The response message is sent to a service switching point, at 508, and a distinctive ring or call waiting tone is applied to the subscriber destination device after the response message is received from the switch control point, at 510.

While a particular illustrative embodiment of an intelligent network system has been described, a similar system may be implemented using a telephony switch or PBX based feature. In a voice over internet protocol (VoIP) type of system, the disclosed functionality may be implemented in a soft switch. Also, although the system has been described with respect to wireline phones, the system is also applicable to wireless carriers and suppliers of wireless networks. Also, while end-to-end SS7 connectivity has been shown, the service does not require the original caller's switch to have end-to-end SS7 connectivity with the subscriber's serving switch.

The disclosed system provides benefits such as allowing subscribers to identify inbound forwarded calls by listening to the call waiting tone or the type of ring tone. Also, telephony carriers can offer a new service to subscribers without the burden of using additional telephone numbers. Thus, an improved system and method relating to distinctive ring and call waiting tones has been disclosed.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of providing a distinctive call waiting tone based on a redirecting number, the method comprising:

receiving a call from an originating device at a redirecting device;

forwarding the call from the redirecting device to a destination device, the forwarded call having an associated data message that includes a calling number of the originating device, a called number of the destination device, and a redirecting number of the redirecting device;

comparing, at a controller communicatively coupled to the destination device, the redirecting number to an authorized set of numbers;

when the authorized set of numbers includes the redirecting number and the destination device is in use, applying a call waiting tone of a plurality of distinctive call waiting tones to the destination device, wherein the call waiting tone is based on the redirecting number; and when the authorized set of numbers includes the redirecting number and the destination device is not in use, applying a ring tone of a plurality of distinctive ring tones to the destination device, wherein the ring tone is determined based on the redirecting number.

2. The method of claim 1, further comprising:

receiving a second call at the destination device, wherein the second call is not forwarded; and applying a normal call waiting tone to the destination device.

3. The method of claim 1, wherein the associated data message is compatible with a Signaling System 7 (SS7) compatible network.

4. The method of claim 1, wherein the method is implemented in a Voice over Internet Protocol (VoIP) type system using a soft switch.

5. The method of claim 1, wherein the method is implemented in a PBX type system.

6. A method of processing an intelligent network communication, the method comprising:
receiving a query message including inbound call data at a controller communicatively coupled to a destination device;
determining that the inbound call data includes a redirecting number;
determining a usage status of the destination device;
comparing, at the controller, the redirecting number to an authorized set of numbers;
when the authorized set of numbers includes the redirecting number and the destination device is in use, formulating a response message to the query message, wherein the response message identifies a call waiting tone of a plurality of call waiting tones to use on a subscriber line and wherein the call waiting tone is determined based on the redirecting number;
when the authorized set of numbers includes the redirecting number and the destination device is not in use, formulating the response message to the query message, wherein the response message identifies a ring tone of a plurality of ring tones to use on a subscriber line and wherein the ring tone is determined based on the redirecting number; and
sending the response message as a reply to the query message.

7. The method of claim 6, wherein the controller is Signaling System 7 (SS7) compatible.

8. The method of claim 6, wherein the controller is a switch control point.

9. The method of claim 6, further comprising applying at least one of the call waiting tone and the ring tone to the destination device in response to the response message.

10. A method of processing a communication, the method comprising:
receiving a call request message including inbound call data;
sending the call request message to a controller communicatively coupled to a destination device;
receiving a response message from the controller, wherein the response message indicates that the call request message includes a redirecting number that is in an authorized set of numbers;
when the destination device is in use, setting a call waiting tone of a plurality of distinctive call waiting tones on a subscriber line, wherein the call waiting tone is determined based on the redirecting number; and
when the destination device is not in use, setting a ring tone of a plurality of distinctive ring tones on the subscriber line, wherein the ring tone is determined based on the redirecting number.

11. The method of claim 10, further comprising:
receiving a second call request message including second inbound call data; and
setting a normal call waiting tone on the subscriber line when the second inbound call data does not include a second redirecting number.

12. The method of claim 10, wherein the method is implemented on a Signaling System 7 (SS7) compatible network.

13. The method of claim 10, wherein the method is implemented in a Voice over Internet Protocol (VoIP) type system using a soft switch.

14. The method of claim 10, wherein the method is implemented in a PBX type system.

15. An intelligent network system comprising:
a switching control point; and
a service switching point coupled to the switching control point;
wherein the service switching point is configured to send a request message to the switching control point, the request message including a subscriber telephone number, a redirecting number, and a destination number;
wherein the switching control point is configured to send a response message to the service switching point;
wherein when a destination device associated with the destination number is in use, the response message identifies a call waiting tone of a plurality of distinctive call waiting tones to apply to the destination device associated with the destination number, wherein the call waiting tone is determined based on the redirecting number; and
wherein when the destination device is not in use, the response message identifies a ring tone of a plurality of ring tones to apply the destination device associated with the destination number, wherein the ring tone is determined based on the redirecting number.

16. The system of claim 15, wherein the service switching point is coupled to the destination device.

17. The system of claim 16, wherein the service switching point applies one of the call waiting tone and the ring tone to the destination device.

18. The system of claim 15, wherein the service switching point receives a call prior to sending the request message to the switching control point.

19. The system of claim 15, wherein the service switching point and the switching control point are Signaling System 7 (SS7) compatible.

20. A system comprising:
a call facilitating module; and
a call logic module coupled to the call facilitating module;
wherein the call facilitating module is configured to send a request message to the call logic module, the request message including a subscriber telephone number, a redirecting number, and a destination number;
wherein the call logic module is configured to send a response message to the call facilitating module;
wherein when a destination device associated with the destination number is in use, the response message identifies a call waiting tone of a plurality of distinctive call waiting tones to apply to the destination device associated with the destination number, wherein the call waiting tone is determined based on the redirecting number; and
wherein when the destination device is not in use, the response message identifies a ring tone of a plurality of ring tones to apply to the destination device associated with the destination number, wherein the ring tone is determined based on the redirecting number.

21. The system of claim 20, wherein the call facilitating module is configured to communicate with the destination device.

22. The system of claim 21, wherein the call facilitating module applies one of the call waiting tone and the ring tone to the destination device.

23. The system of claim 20, wherein the call facilitating module receives a call message prior to sending the request message to the call logic module.

* * * * *